(12) United States Patent
Fischer

(10) Patent No.: US 7,025,008 B2
(45) Date of Patent: Apr. 11, 2006

(54) AGRICULTURAL IMPLEMENT HITCH

(76) Inventor: Rex A. Fischer, 0404 S. 900 E., Avilla, IN (US) 46710

( * ) Notice: Subject to any disclaimer, the term of this patent is extended or adjusted under 35 U.S.C. 154(b) by 0 days.

(21) Appl. No.: 10/836,015

(22) Filed: Apr. 30, 2004

(65) Prior Publication Data

US 2004/0216654 A1 Nov. 4, 2004

Related U.S. Application Data

(60) Provisional application No. 60/478,687, filed on Jun. 13, 2003, provisional application No. 60/467,304, filed on May 2, 2003.

(51) Int. Cl.
- *A01B 15/16* (2006.01)
- *A01B 23/06* (2006.01)
- *A01B 59/00* (2006.01)
- *A01C 5/00* (2006.01)
- *A01C 7/18* (2006.01)

(52) U.S. Cl. .................. 111/52; 111/900; 172/605; 172/680

(58) Field of Classification Search .............. 172/605, 172/677, 679, 680, 439–450; 111/52, 900
See application file for complete search history.

(56) References Cited

U.S. PATENT DOCUMENTS

| | | | |
|---|---|---|---|
| 3,865,406 A | 2/1975 | Dutton | 289/490 |
| 3,986,727 A * | 10/1976 | Cox | 280/417.1 |
| 4,148,498 A | 4/1979 | Taylor, Jr. | 280/490 |
| 4,153,270 A | 5/1979 | Brockmiller | 280/490 |
| 4,504,077 A | 3/1985 | Hobbs | 280/490 |
| 4,564,209 A | 1/1986 | Kingsley et al. | 280/468 |
| 4,929,028 A | 5/1990 | Underwood | 298/19 |
| 5,257,797 A | 11/1993 | Johnson | 280/477 |
| 5,286,050 A | 2/1994 | Stallings, Jr. et al. | 280/477 |
| 6,238,170 B1 * | 5/2001 | Pingry et al. | 414/550 |

* cited by examiner

*Primary Examiner*—Christopher J. Novosad
(74) *Attorney, Agent, or Firm*—Taylor & Aust, P.C.

(57) ABSTRACT

An implement lift system for connection to a tractor and a farm implement, the system including a frame having a plurality of pivotal attachment devices being the sole structural connection of the implement lift system to the tractor. The pivotal attachment devices are substantially aligned about an axis and a support member is associated with the frame. The support member is movable in a plane substantially parallel with the axis. The support member being connectable to the farm implement.

18 Claims, 6 Drawing Sheets

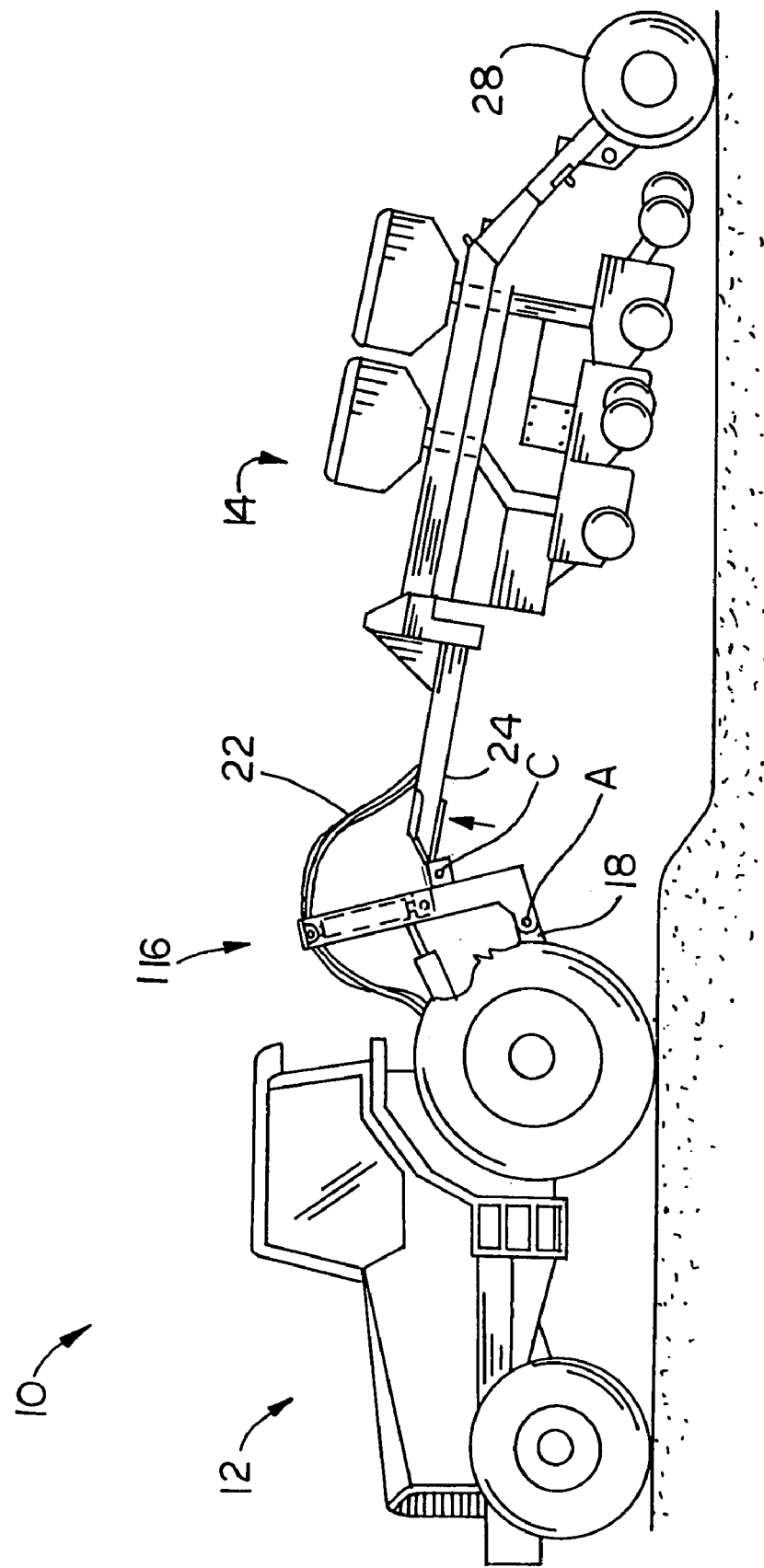

AGRICULTURAL IMPLEMENT HITCH

CROSS REFERENCE TO RELATED APPLICATIONS

This is a non-provisional application based upon U.S. provisional patent application Ser. No. 60/467,304, entitled "AGRICULTURAL IMPLEMENT HITCH", filed May 2, 2003 and U.S. provisional patent application Ser. No. 60/478,687, entitled "AGRICULTURAL IMPLEMENT HITCH", FILED Jun. 13, 2003.

BACKGROUND OF THE INVENTION

1. Field of the Invention

The present invention relates to an agricultural implement hitch, and, more particularly, to an agricultural implement hitch having extended lift capability.

2. Description of the Related Art

The lifting of agricultural implements predates the tractor driven agricultural implements of today. Horse drawn equipment would often have a mechanical leveraging device that when engaged would cause the lifting of a part of an agricultural implement due to the forward motion provided by the animals under harness.

It is known to have a hydraulic and a mechanical lift apparatus on tractors that provide a lifting action to agricultural implements. Such a lift apparatus takes a form of lifting arms and or a three-point hitch arrangement. Additionally, "quick hitch" implementations have become widely popular. The lifting apparatus associated with a tractor is generally pivoted about an attachment point thereon.

The problem with implement lifts integrated with a tractor is that they have limited vertical capability. An additional problem is that a low clearance implement, towed behind the tractor, may not be lifted vertically to a sufficient extent in order to clear an obstacle or terrain change between the tractor and the implement.

What is needed in the art is a lift system that extends the lift capability of the tractor.

SUMMARY OF THE INVENTION

The present invention provides a lift system utilized with a tractor in addition to any lift system that is integral with the tractor.

The invention comprises, in one form thereof, a farming apparatus including a tractor, a farm implement and an implement lift system. The implement lift system including a frame having a pivotal attachment arrangement connected to the tractor about an axis. The pivotal attachment device being the sole structural connection of the implement lift system to the tractor. The implement lift system additionally including a support member associated with the frame, the support member movable in a plane substantially parallel with the axis and the support member being connected to the farm implement.

The present invention advantageously allows an additional vertical lift thereby extending any lift capability that the tractor may have.

Another advantage of the present invention is that a lift apparatus may be installed on a tractor that has no other vertical lift capability.

Yet another advantage is that the implement lift system of the present invention allows for a pivotal connection of the lift apparatus to the tractor.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 is a side view of a lift system of another embodiment of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
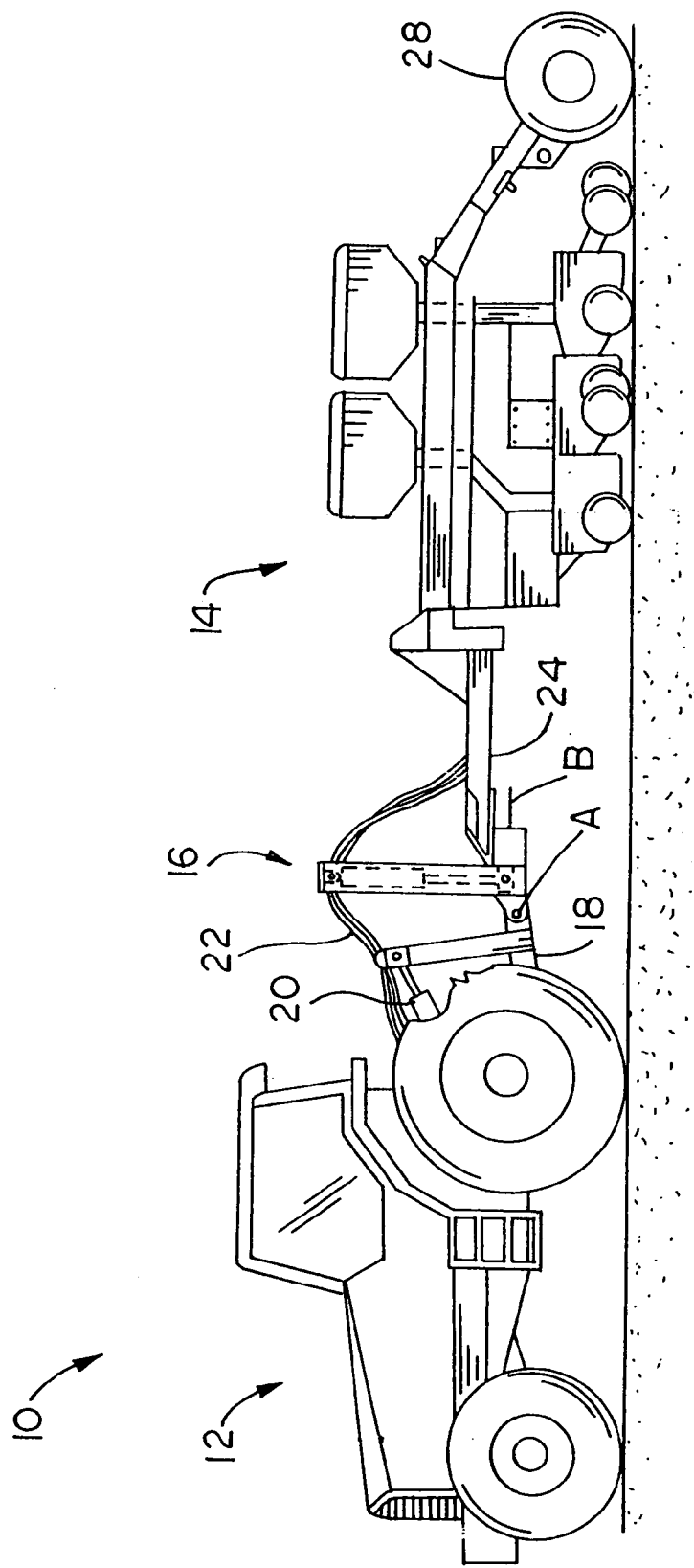
FIG. 1 is a side view of a farming apparatus utilizing the lift system of an embodiment of the present invention.
Figure 2:
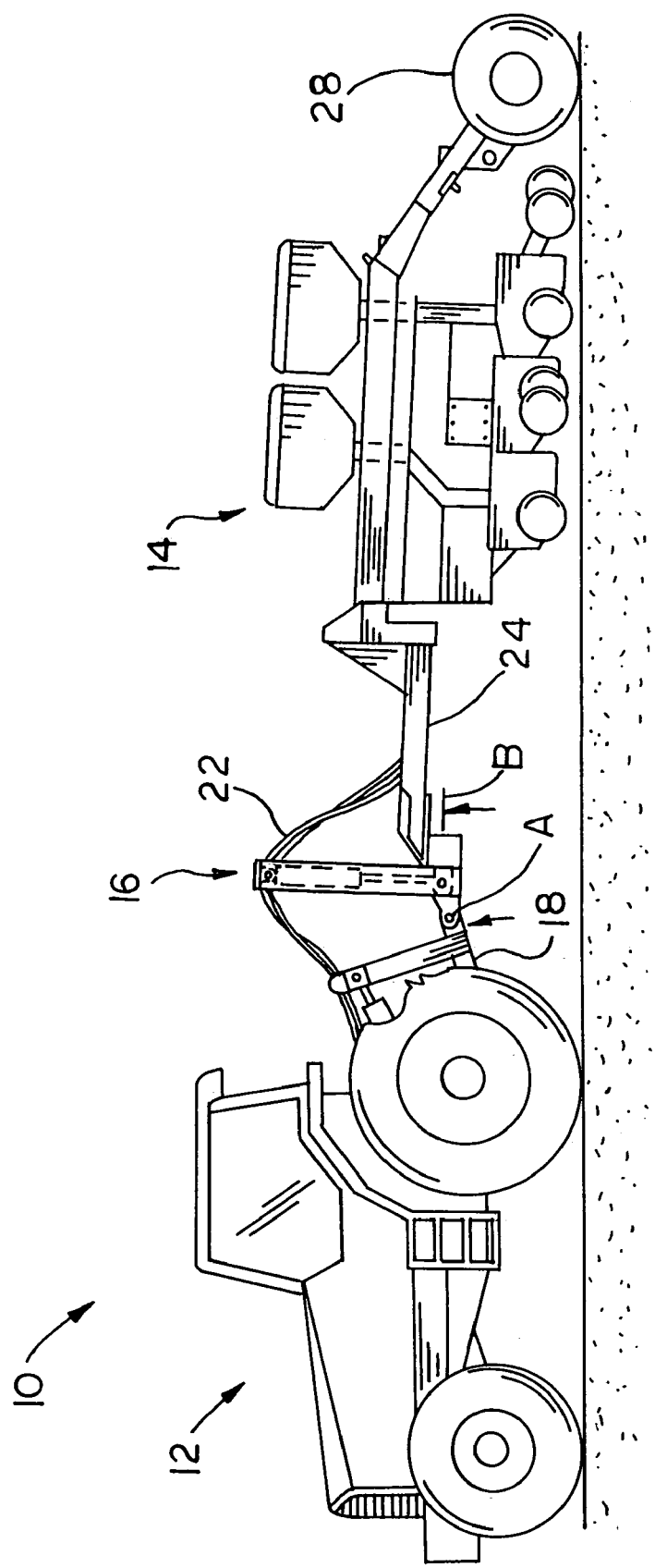
FIG. 2 is a side view of the lift system of FIG. 1, illustrating a partial lift of the farm implement.
Figure 3:
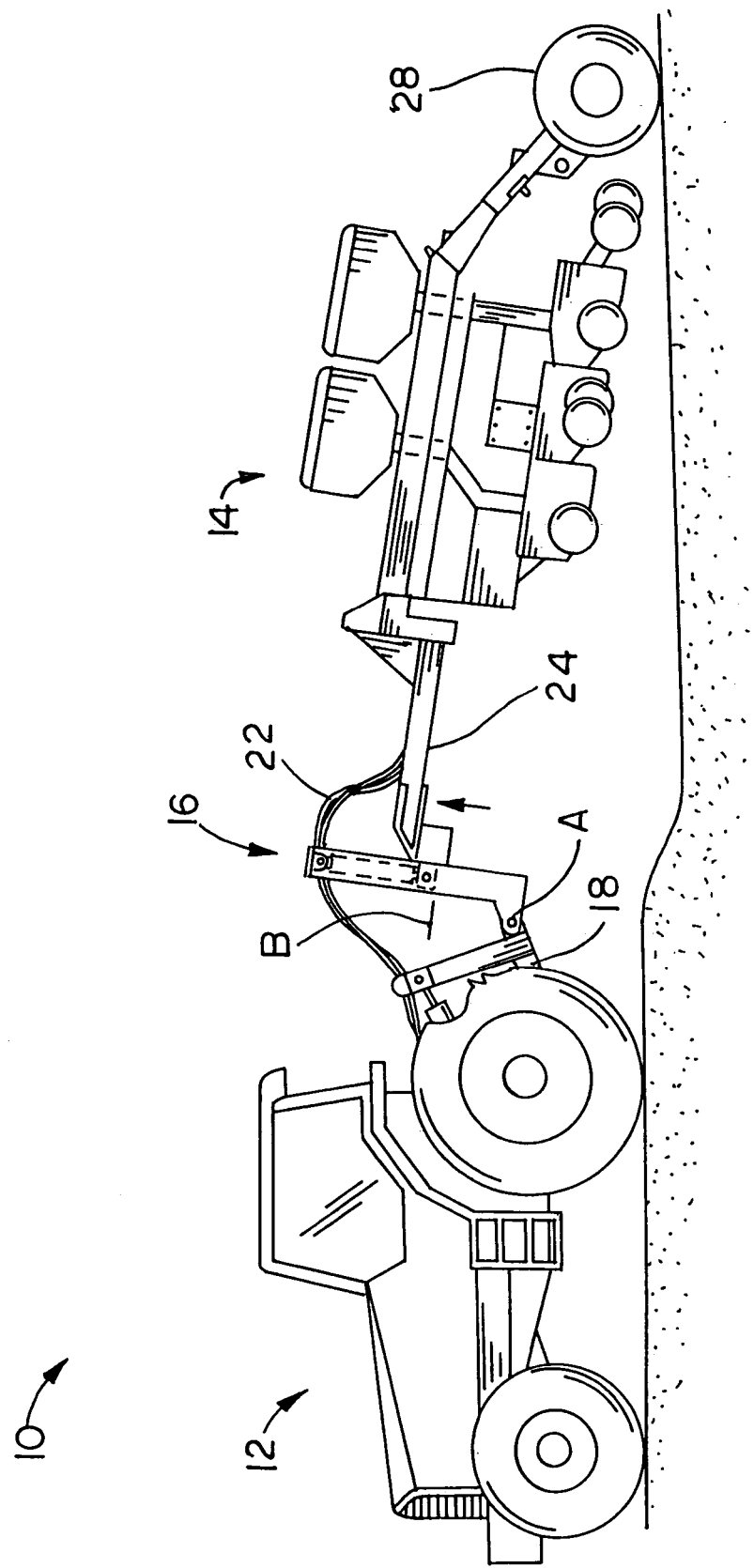
FIG. 3 is a side view of the system of FIGS. 1 and 2 illustrating another position of the lift system.

Referring now to the drawings, and more particularly to FIGS. 1–3, there is shown a farming apparatus 10 including a tractor 12, an implement 14 and a lift system 16. Tractor 12 includes lift arms 18, hydraulic cylinder 20 and hydraulic hoses 22, which are interconnected with the hydraulic system of tractor 12. Lift arms 18 may be part of a three-point hitch system or interconnected with a quick hitch device. Hydraulic cylinder 20 may be simply an adjustable third link for a three-point hitch system. Lift arms 18 pivot about a point of attachment on a frame member of tractor 12. The upward motion of arms 18 cause a point to move along an arc described by the connection of arms 18 and the length of arms 18.

Figure 4:
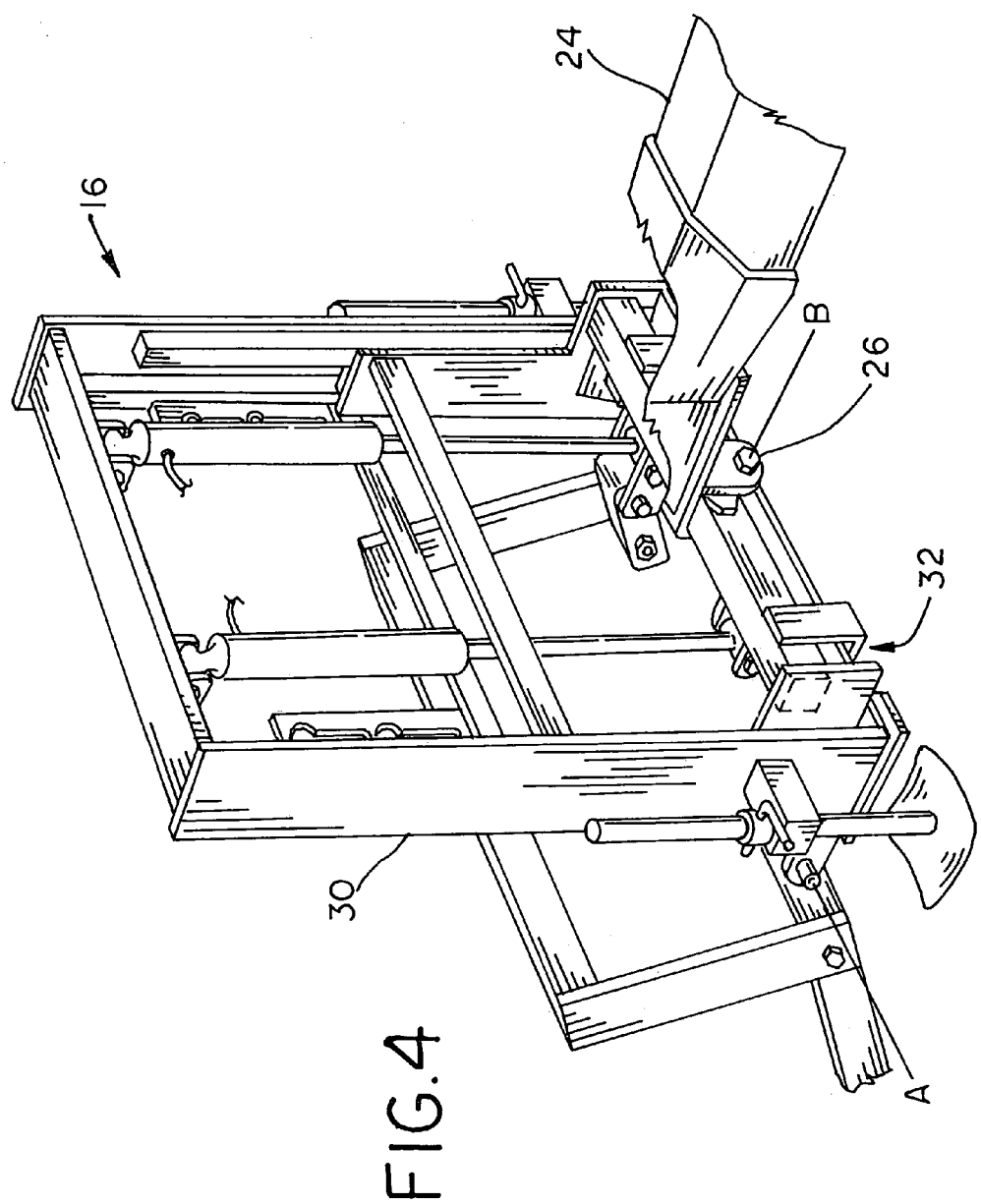
FIG. 4 is a perspective view of the lift system of FIGS. 1–3.
Figure 5:
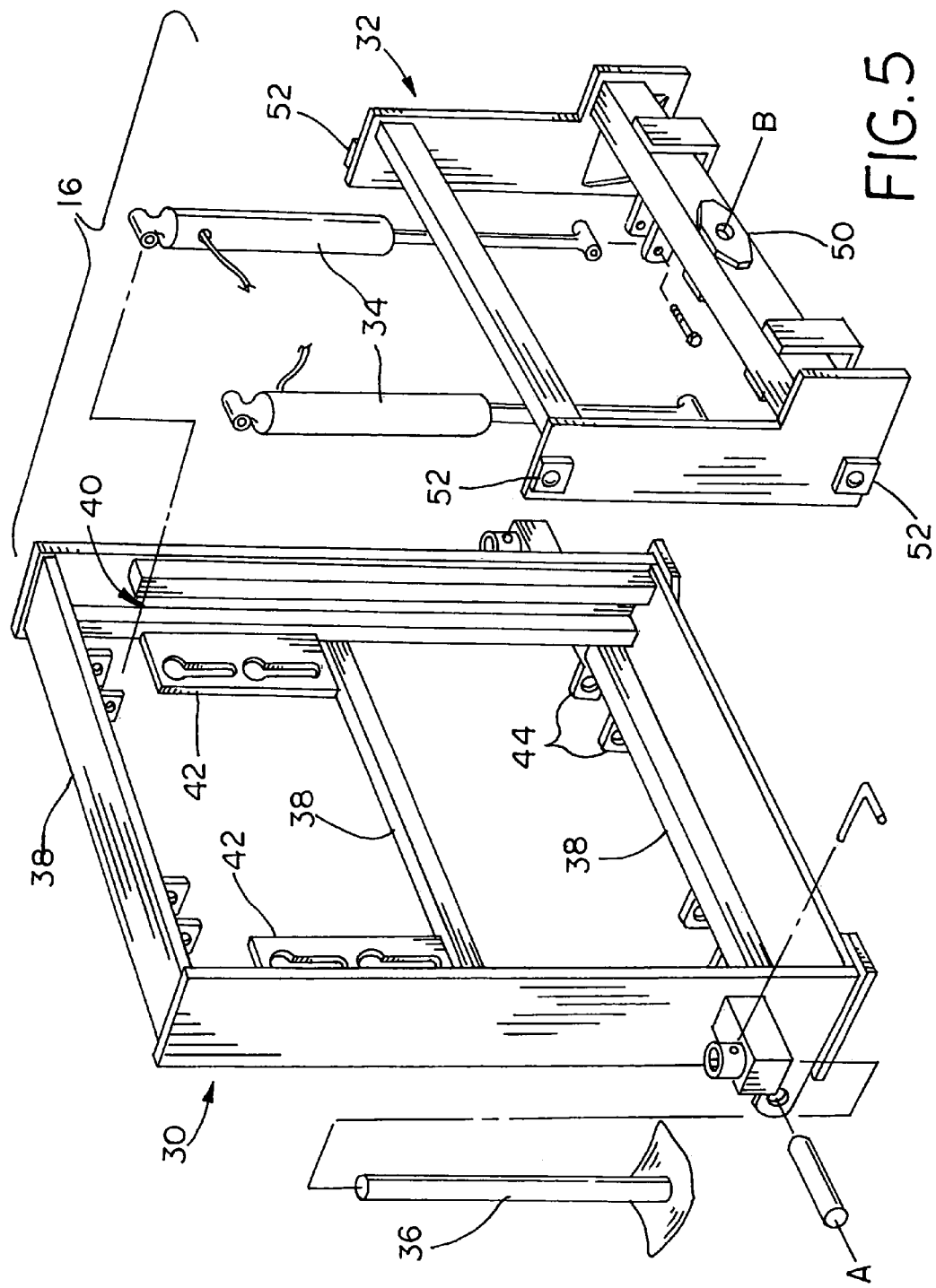
FIG. 5 is an exploded perspective view of the lift system of FIGS. 1–4.

Now, additionally referring to FIGS. 4 and 5, implement 14 includes implement tongue 24 attached to lift system 16 by way of attachment pin 26. Wheel 28 provides a pivot point at an end of implement 14 opposite tongue 24. As tongue 24 is lifted, implement 14 pivots about wheel 28, thereby raising a portion of implement 14. This lifts portions of implement 14 that are in contact with the ground, off of the ground.

Lift system 16 includes a frame 30, a support member 32, hydraulic cylinders 34 and outrigger supports 36. Frame 30 includes cross supports 38, an internal track 40 on each side of frame 30, hose retainers 42 and pivotal attachment arrangements 44. Cross member supports 38 provide structural rigidity to frame 30 and provide attachment points for hydraulic cylinders 34 and pivotal attachment arrangements 44. Internal track 40 accommodates support member 42 allowing it to be movable within frame 30. Frame 30 is attached to arms 18 about axis A by way of a pin inserted through pivotal attachment arrangement 44. Frame 30 is pivotally attached to arms 18 of tractor 12 about axis A, which serves as the only structural support between tractor 12 and lift system 16. Implement tongue 24 is attached to support member 32 along axis B. Axis B being generally orthogonal to axis A, but the two do not necessarily intersecting each other.

Support member 32 includes attachment point 50 by which tongue 24 of implement 14 is attached. Support member 32 additionally includes slide plates 52, which may be in the form of linear bearings 52, which engage within track 40 to provide slidable movement along a plane that is generally coplanar with axis A and orthogonal to axis B.

Hydraulic cylinders 34 are utilized to lift support member 32 and thereby lift tongue 24 of implement 14. Hydraulic hose connections from tractor 12 may be positioned in hose retainers 42 in order to route hydraulic hoses to lift system 16 and/or implement 14. When implement 14 is not in use lift system 16 may remain attached thereto utilizing outriggers 36, which are vertically adjustable. This allows lift system to remain attached to implement 14 and thereby become dedicated to implement 14. Outriggers 36 are vertically adjustable to accommodate a preferred tongue height of implement 14 to avoid damage to any undercarriage portions of implement 14.

The operating mode as shown in FIG. 1 illustrates a normal operation of implement 14, which in this example is a planter 14 being towed by tractor 12. Implement 14 includes any farm implement, such as the planter illustrated in the Figs. and additionally includes a bale spear, lifting forks and a trailer. Axis B is very close to axis A and may even be intersecting. In FIG. 2 lift arms 18 are elevated causing an angular displacement between arms 18 and lift system 16. The angular displacement is a rotation about axis A, which causes tongue 24 to elevate. Tongue 24 is affixed to lift system 16 by way of attachment point 50 thereby keeping tongue 24 aligned with axis B. FIG. 3 illustrates the actuating of hydraulic cylinders 34 of lift system 16 causing axis B to elevate away from axis A causing tongue 24 to be additionally lifted above the ground. This advantageously allows portions of implements 14 to be raised higher and thereby avoid damage when traversing grade differences in the ground. Rotation about axis A increases as tongue 24 raises since tongue 24 is constrained to be oriented along axis B by way of attachment point 50. Under normal operation the elevation of tongue 24, as shown in FIG. 3, is only for temporary movement of implement 14, generally at lower speeds so as to prevent damage to a portion of implement 14. Once farming apparatus 10 moves beyond an aberration on the ground and implement 14 re-engages the ground, as shown in FIG. 1, axis B is again proximate to axis A thereby allowing the force necessary to tow implement 14 to be transferred nearly directly to implement 14.

Now, additionally referring to FIG. 6 there is shown another embodiment of the present invention wherein lift system 116 is rigidly mounted to a lift system of tractor 12 including arms 18 and attachment device 20. IN this embodiment, as tongue 24 is lifted, tongue 24 rotates about axis C and lift system 116 rotates about another axis, not shown, which is attached to arms 18. As in the previous embodiment the retraction of cylinders 34 allow tongue 24 to be elevated beyond the capability of lift arms 18. As in lift system 16, lift system 116 has at least an up and a down position in which tongue 24 may be elevated and/or lowered when tongue 24 is in normal operating position axis C is substantially parallel and in line with axis A.

Advantageously, both embodiments of the present invention allow for the vertical elevation of a portion of a farm implement to allow an operator to traverse ground that is uneven. Such uneven ground often occurs at an entry point into a field or in areas that have been eroded or otherwise disturbed. Farm implements, such as a planter 14, are relatively expensive and to not be able to elevate sensitive parts to an appropriate height can often cause damage, thereby reducing the effectiveness of planting system 14. It is the present invention that alters the vertical lift capability of tractor 12, thereby allowing implement 14 to safely traverse elevation changes of the ground.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A farming apparatus, comprising:
    a tractor;
    a farm implement; and
    an implement lift system including:
        a frame having a pivotal attachment arrangement connected to said tractor about an axis, said pivotal attachment arrangement being the sole structural connection of said implement lift system to said tractor; and
        a support member associated with said frame, said support member movable in a plane substantially parallel with said axis, said support member being connected to said farm implement, said frame pivoting about said axis when said support member moves in said plane.

2. The apparatus of claim 1, wherein said farm implement is pivotally connected to said support member about an other axis.

3. The apparatus of claim 2, wherein said other axis is substantially orthogonal to said plane.

4. The apparatus of claim 3, wherein said farm implement is a planter.

5. The apparatus of claim 3, wherein said support member has at least two positions relative to said frame including an up position and a down position, said up position lifting an end of said implement.

6. The apparatus of claim 5, wherein said down position positions said other axis proximate to said axis.

7. The apparatus of claim 1, further comprising at least one hydraulic cylinder connected to both said frame and to said support member.

8. The apparatus of claim 1, wherein said pivotal attachment arrangement includes two pivotal attachment points.

9. An implement lift system for connection to a tractor and a farm implement, the system comprising:
    a frame having a plurality of pivotal attachment devices being the sole structural connection of said implement lift system to the tractor, said pivotal attachment devices substantially aligned about an axis; and
    a support member associated with said frame, said support member movable in a plane substantially parallel with said axis, said support member being connectable to the farm implement, said frame pivoting about said axis as said support member moves in said plane.

10. The system of claim 9, wherein said support member includes an attachment point for the farm implement about an other axis.

11. The system of claim 10, wherein said other axis is substantially orthogonal to said axis.

12. The system of claim 11, wherein said support member has at least two positions relative to said frame including an up position and a down position, said up position lifting said other axis away from said axis.

13. The apparatus of claim 12, wherein said down position positions said other axis proximate to said axis.

14. The system of claim 9, further comprising at least one hydraulic cylinder connected to both said frame and to said support member.

15. A method of elevating a portion of a farm implement pulled by a tractor, comprising the steps of:
attaching a lift device to an end of the farm implement;
pivotally attaching said lift device to the tractor about an axis such that said lift device is only attached to said tractor by said pivotally attaching step; and
actuating said lift device;
pivoting the farm implement about an other end of the farm implement; and
pivoting said lift device about said axis, said pivoting the farm implement step and said pivoting said lift device being dependent upon said actuating step.

16. A farming apparatus, comprising:
a tractor;
a farm implement; and
an implement lift system including:
a frame having a pivotal attachment device connected to said tractor about an axis, said frame including an internal track; and
a support member associated with said frame, said support member movable in a plane substantially parallel with said axis, said support member being connected to said farm implement, said support member having at least four bearing devices, said at least four bearing devices movable along said internal track, said frame pivoting about said axis as said support member moves in said plane.

17. The apparatus of claim 16, further comprising at least two outriggers connected to said frame, said outriggers being adjustable and configured to support said frame upon a surface.

18. The apparatus of claim 16, wherein said farm implement is one of a planter, a bale spear, lifting forks and a trailer.

* * * * *